Patented Sept. 26, 1950

2,524,018

UNITED STATES PATENT OFFICE 2,524,018

MELAMINE DECOLORIZATION

Johnstone S. Mackay, Old Greenwich, and William P. Lawler, Springdale, Conn., assignors to American Cyanamid Company, New York, N. Y., a corporation of Maine No Drawing. Application November 10, 1947, Serial No. 785,189

4 Claims. (Cl. 183—114.2)

The present invention relates to the treatment of melamine, and more particularly, to decolorizing the same.

In the preparation of melamine by the various high temperature processes in use today, sufficient color develops and contaminates the melamine so that when it is condensed with formaldehyde and the like the resulting resinous syrup is of an amber or dark brown color. Such coloration, of course, is the result of the presence of a very small amount of colored impurity in the melamine, and while it does not interfere with the use of the melamine in other reactions and other applications, it seriously limits the type of plastic materials in which the melamine can be employed. Since the bulk of the melamine produced is used in the preparation of plastic products and most of such plastic products must be of light color or even transparent, it is obvious that the decolorization of melamine is highly important. It has been attempted to prevent the development of color in the first place by the use of various materials in the fabrication of the apparatus employed in the production of the melamine, but so far this line of approach has not been completely successful and the necessity of treating the melamine to decolorize it remains.

An object of the invention is to provide melamine free from color.

Another object of the invention is to provide a method whereby melamine may be decolorized.

A further object of the invention is to provide a process for decolorizing melamine which may be used in conjunction with a process for its production which involves the vaporization of melamine.

A still further object is to provide a process for decolorizing melamine in the vapor state.

These and other objects are accomplished in accordance with the invention to be disclosed more fully hereinafter.

It has now been found that melamine may be decolorized by contacting its vapors with certain adsorbents. Such adsorbents are the activated carbons and the activated oxides, and mixtures thereof, of the elements of groups II B, III A, IV A, IV B of the periodic table, more specifically the periodic chart shown on pages 54-5 of Lange's "Handbook of Chemistry," Handbook Publishers, Inc., Sandusky, Ohio, 1944.

The activated carbons contemplated for use in the process of the present invention include bone char, sugar charcoal, vegetable charcoal, wood charcoal, and the various other forms of activated carbon. The activated oxides which may be employed in the process of the invention are those which are capable of forming a hydrous oxide gel. Such gels are thereafter dried under such conditions of temperature and rate of drying that the gel structure remains substantially intact so that a large surface area is provided. Some of the activated oxides occur naturally, the formation of the gel and the subsequent drying thereof having apparently taken place by natural processes. An example of this type of oxide is fuller's earth. Other materials such as the clays are readily obtainable in gel form and need only to be dried in order to provide an activated oxide. The bulk of the oxides, however, require a greater amount of treatment for activation. Examples of the activated oxides contemplated for use as adsorbents in the process of the present invention include the aforementioned fuller's earths, the acid washed clays, the activated bauxites, activated alumina, silica gel, a synthetic hydrous magnesium silicate "Magnesol," as well as the activated oxides of aluminum, gallium, indium, thallium, zinc, cadmium, silicon, germanium, tin, lead, titanium, zirconium, thorium, and mixtures of such oxides. Such mixed oxides may result from the admixture of different hydrous oxide gels which are thereafter dried as aforementioned, or they may be the result of the simple mechanical admixture of one or more of such dried oxide gels. While there is a wide variety of other adsorbents, including the activated oxides of other elements, such other adsorbents are not contemplated as being within the scope of the invention. The activated oxides of such elements as iron, chromium, tungsten, manganese, cobalt, nickel, platinum, copper, and the like, for example, instead of serving to decolorize the melamine result in the development of more color, apparently by catalyzing the decomposition of melamine.

The process of the invention offers particular advantage when used in conjunction with a process for the production of melamine which involves the vaporization of the material. In certain processes for producing melamine, for example, it is advantageous to remove the melamine from the high pressure high temperature zone in the form of vapor, since this is an easy way of removing the material without decomposition. Also, particular non-volatile impurities which sometimes contaminate the product make it desirable to employ a purification step involving the vaporization of melamine.

In carrying out the process of the invention the melamine vapors are simply passed over or through the adsorbent, it being preferable to employ a chamber packed with the adsorbent in order to provide for maximum contacting of the melamine vapor with the adsorbent. While the melamine may be vaporized by the simple application of heat, it is advantageous to employ a sweeping gas, preferably ammonia, although other gases such as air, nitrogen, and the like, may also be employed in this connection. The use of such a sweeping gas effectively decreases the temperature required for the vaporization of the melamine so that a temperature as low as 275° C. will be found adequate for this purpose. In some cases, the melamine is necessarily vaporized under high pressures, as, for example, 500 lbs./sq. in. and under such conditions a higher temperature, say, 350° C., is required. Advantage is derived from the use of ammonia as a sweeping gas, since it serves to stabilize the melamine against decomposition and particularly against deammonation to form melam, melem, and melon.

While the invention has been described with particular reference to specific embodiments, it is to be understood that it is not to be limited thereto, but is to be construed broadly and restricted solely by the scope of the appended claims.

What is claimed is:

1. A process of removing hydrogen cyanide from melamine comprising contacting vaporized melamine with an adsorbent selected from the group consisting of an activated carbon, a solid activated oxide of an element of groups II B, III A, IV A, IV B of the periodic table, and mixtures thereof at a temperature exceeding 275° C.

2. A method of removing hydrogen cyanide from melamine which comprises contacting vaporized melamine with an activated carbon at a temperature exceeding 275° C.

3. A method of removing hydrogen cyanide from melamine which comprises contacting vaporized melamine with an activated alumina at a temperature exceeding 275° C.

4. A method of removing hydrogen cyanide from melamine which comprises contacting vaporized melamine with an activated magnesium silicate at a temperature exceeding 275° C.

JOHNSTONE S. MACKAY.
WILLIAM P. LAWLER.

REFERENCES CITED

The following references are of record in the file of this patent:

UNITED STATES PATENTS

| Number | Name | Date |
| --- | --- | --- |
| 1,541,147 | Ikeda | June 9, 1925 |
| 1,693,915 | Brode | Dec. 4, 1928 |
| 2,224,061 | Pechukas | Dec. 3, 1940 |
| 2,288,964 | Widmer | July 7, 1942 |